United States Patent [19]

Ciaio

[11] Patent Number: 4,906,877
[45] Date of Patent: Mar. 6, 1990

[54] MHD GENERATOR AND FLUID PUMP

[76] Inventor: Frank A. Ciaio, 33 Old Estate Rd., Manhasset, N.Y. 11030

[21] Appl. No.: 238,615

[22] Filed: Aug. 30, 1988

[51] Int. Cl.$^4$ .............................................. H02K 44/00
[52] U.S. Cl. ....................................................... 310/11
[58] Field of Search ........................................... 310/11

[56] References Cited

U.S. PATENT DOCUMENTS

| | | | |
|---|---|---|---|
| 3,385,983 | 5/1968 | Bohn et al. | 310/11 |
| 3,413,504 | 11/1968 | Baker | 310/11 |
| 4,691,130 | 9/1987 | Gillissen | 310/11 |

Primary Examiner—Patrick R. Salce
Assistant Examiner—Judson H. Jones
Attorney, Agent, or Firm—Bauer & Schaffer

[57] ABSTRACT

A closed wall having an electrically conductive inner surface forming an electrode. A body is mounted within the wall cooperating with the wall to an orbital path for the flow of fluid, and a second conductive electrode passes through the center of the body. A flux field is induced parallel to the axis of the wall. An inlet and outlet are provided at opposite ends of the helical body for circulation of electrically conductive fluid, through the path perpendicular to the flux field.

20 Claims, 8 Drawing Sheets

U.S. Patent  Mar. 6, 1990  Sheet 1 of 8  4,906,877
FIG. 1A
PRIOR ART
FIG. 1B
PRIOR ART
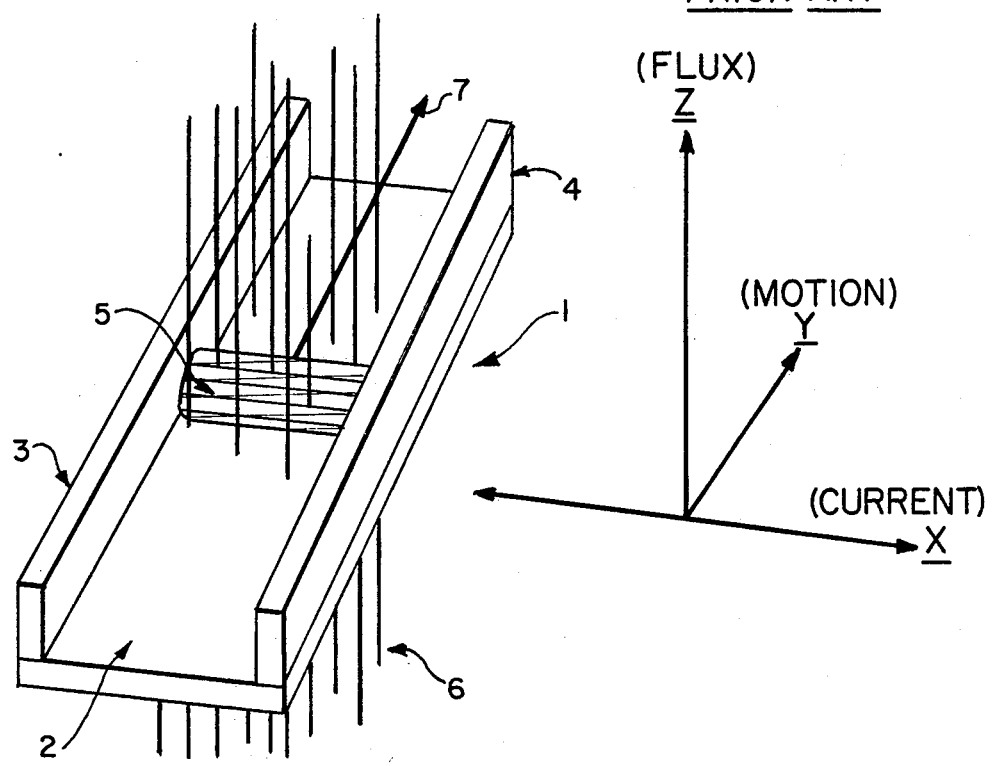
FIG. 2A
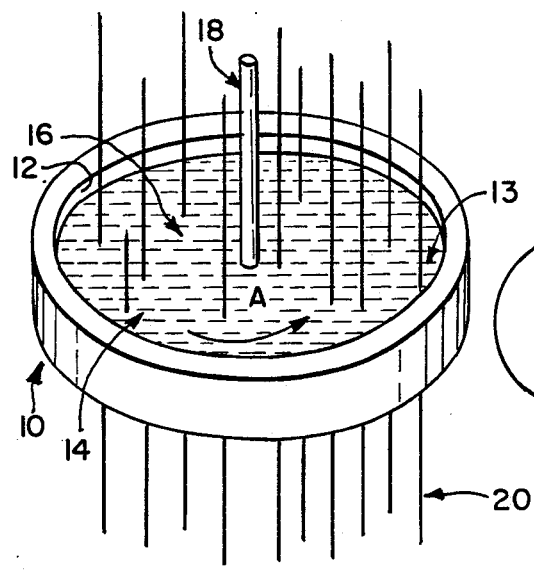
FIG. 2B
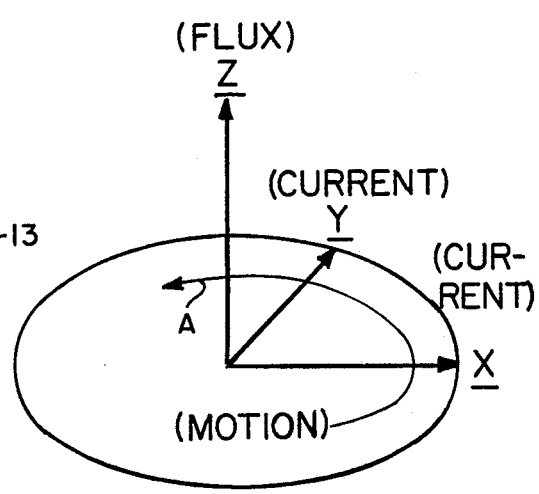

MHD GENERATOR AND FLUID PUMP

BACKGROUND OF THE INVENTION

The present invention relates to a method and apparatus for generating electrical power and in particular to Magnetohydrodynamic Induction Devices utilizing electrical and magnetic forces acting upon a conductive fluid.

The conventional theory underlying MHD generator/pump devices is illustrated in FIG. 1a. A sluice 1 having an electrically insulated bed 2 and a pair of sides 3 and 4, both consisting of electrically conductive contacts, and, preferably being a nonmagnetic material, is loaded with a quantity of electrically conductive fluid 5 so as to make contact with both sides 3 and 4. Penetrating the sluice 1 is a magnetic field whose lines of flux 6 are generally perpendicular to the sluice bed 2, and thus, the fluid 5. If the fluid 5 is displaced within the sluice 1 in the direction of arrow 7, that is, parallel with the contact sides 3 and 4, and, perpendicular to the lines of flux 6, a D.C. electrical current is developed within the fluid 5. This electrical current can be harnessed via the contacts 3 and 4. The stronger the flux 6, (i.e. a higher flux density), the higher net amperage of resultant current. Similarly, the more accelerated the motion of the fluid 5, the higher the voltage of the resultant current.

In reverse, if a D.C. electrical current is supplied to the contacts 3 and 4 so that contact 3 becomes the negative pole, and contact 4, the positive pole, the flux lines 6 are produced, being oriented with North upwards, then the fluid 5 will be displaced in the direction of arrow 7. If the polarity of current is reversed, or the orientation of the flux lines 6 are reversed, then the fluid will be displaced in a direction opposite that of arrow 7. The higher the amperage of the current applied to contacts 3 and 4, the greater the quantity of fluid 5 is displaced. The higher the voltage applied across the contacts, the more accelerated the displacement of the fluid 5.

FIG. 1b illustrates the relationships of the three operating forces at work in the MHD device of FIG. 1a. In general, flux lines Z are perpendicular to the displacement Y, and, the current X generated; the same holding true for all three axis. Any deviance from the perpendicular in any one axis, or of all three, results in inefficiencies within the system from the ideal; the greater the variance, the greater the inefficiency produced, possibly even down to zero output of current or displacement of fluid.

All the prior art devices thus exhibit a linear perpendicularity of the three X,Y, and Z axis and further employ linear devices in one form or other be it the shape of a tube, toroid, or channel, to maintain the general principles of linear perpendicularity of displacement, to flux, to current, and each to the other. The sluice depiction in FIG. 1a is therefor an accurate although very simplified illustration of the prior art.

The principles of the prior art have been embodied in a wide variety of devices, as referred to in U.S. Pat. Nos. 1,196,511; 2,850,652; 3,010,153; 3,149,250; 3,206,768; 3,263,283; 3,514,645; 3,527,220; 3,539,921; 3,585,422; 3,629,218; 3,757,846; 3,854,065 and 4,110,630 will show. While most of these devices are useful to accomplish their intended purposes, they do not exhibit desirable levels of efficiency since they all have high levels of Back-EMF and thus, produce less than desirable levels of electrical current or fluid movement, etc. Moreover, most of the known devices require a large number of moving parts, thus being complex to construct and operate. There exists, therefore, a need for the provision of improved magnetohydrodynamic devices which are more efficient as electrical generators, pumps or motors.

It is further an object of this invention to provide apparatus for the generation of electrical current having greater efficiency by reducing Back-EMF inherent in the magnetic generation of electrical current.

It is further an object of this invention to utilize the laws of fluid mechanics in the magnetic generation of electrical current.

It is further an object of this invention to provide an improved device for the displacement of an electrically conductive fluid.

It is further an object of this invention to provide an improved device which can simultaneously displace an electrically conductive fluid while generating an electrical current.

It is further the object of this invention to provide an MHD electrical generator which does not require an excessive number of moveable parts, is limitless in size, and of which the manufacture is simple.

These objects, as well as other objects and advantages, will be apparent from the following disclosure.

SUMMARY OF THE INVENTION

According to the present invention, an orbital characteristic rather than the linear characteristic in electron and fluid flow, etc., is produced so that fluid displacement occurs in the plane of current, and current occurs in the plane of fluid displacement, with both having a polar relationship to each other, while maintaining a perpendicular relatiohship with the magnetic flux.

In general, all embodiments of the present invention employ an orbit wall, defining a closed chamber. The orbit wall is made of nonmagnetic material and has on its inner surface a first electrical contact and is provided with axially spaced inlet and outlet means for the passage of electrically conductive fluid substantially axially through the container. Mounted coaxially within the container, is a helical body having a central longitudinal core comprising the other electrical contact and a flat wide continuous blade of plurality of turns. The helical blade is made of a material which supports, enhances, or generates a magnetic field generally perpendicular to the plane of the helical blade and is electrically insulated from the orbit wall, and the longitudinal core comprises the second electrical contact. The helical blade has a diameter such that its perimeter abuts or is attached to the orbit wall, thus defining with the orbit wall, a continuous helical pathway for the passage of the conductive fluid, from the inlet to the outlet. A magnetic flux field is produced within the chamber or outside the chamber to extend along the longitudinal axis of the chamber.

Upon circulation of an electrically conductive fluid through the chamber intersecting the lines of flux, electrical current will be generated. In reverse, if current is supplied to the conductors, the conductive fluid will progress along the helical body. Attached to each of the electrical contact surfaces (i.e. the inner surface of the orbit wall and the center longitudinal core of the helical body are electrical conductors of the type and size sufficient to transmit the electrical current produced to a load imposed upon them.

In addition to its use as a generator, the apparatus of the present invention is useful to pump fluid, or as a motor when an electrical current is applied thereto, since in both instances, it will act to circulate the fluid as the driving force.

Full details of the present invention are set forth in the following description and illustrated in the accompanying drawings:

BRIEF DESCRIPTION OF THE DRAWINGS

In the Drawings

FIG. 1a is a simplified illustration of a prior art MDH* device;

FIG. 1b is a vector schematic of the forces acting in the device of FIG. 1a;

FIG. 2a is an orbital MHD device embodying the present invention;

FIG. 2b is a vector schematic of the forces acting in the device of FIG. 2a;

FIG. 3b is a vector schematic of the forces acting in the device of FIG. 3a.

DESCRIPTION OF THE INVENTION

Figure 3A:
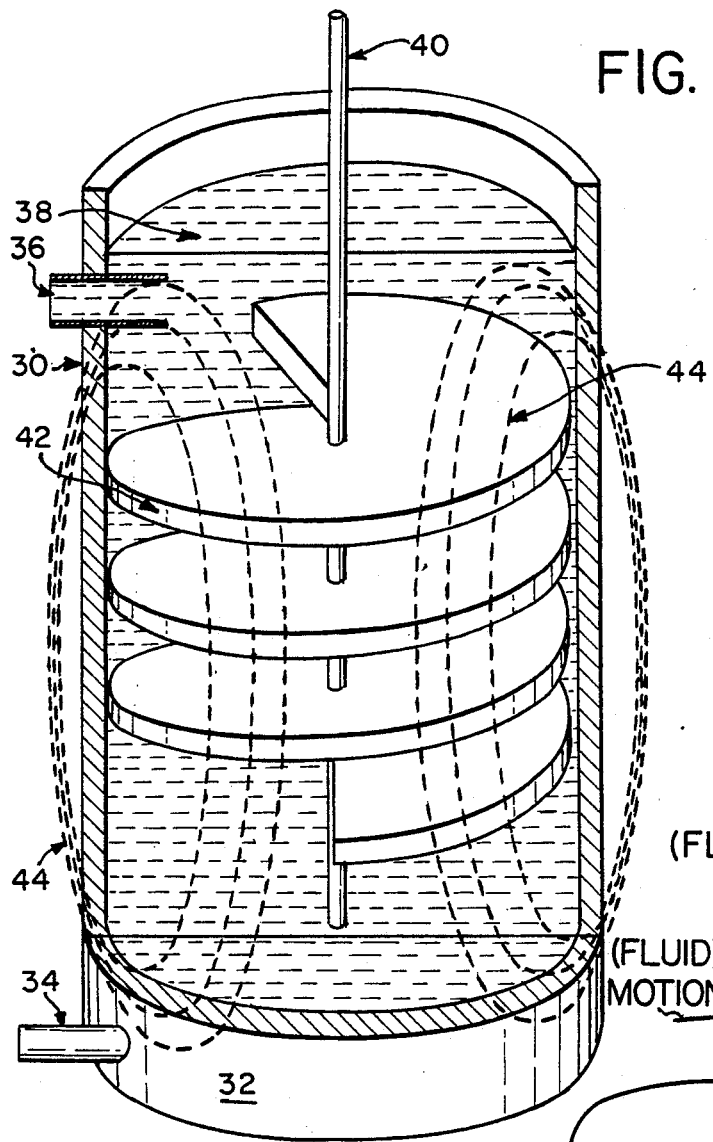
FIG. 3a is a simplified cut-away drawing of another apparatus embodying the present invention.

The method of the present invention is broadly illustrated in FIG. 2a. An orbit wall 10 is provided of nonmagnetic and nonconductive material which is lined with a conductive layer 12. The term orbit wall is employed to more accurately define the nature of the forces acting on and produced by the flowing fluid and current within the apparatus, as will become apparent hereinafter. The wall may be cylindrical, or elliptical for example or other closed tubular forms supporting circulation of the fluid about its central axis. The orbit wall is closed at at least it bottom by a wall 13 to form a closed container 14 for an electrically conductive fluid 16. Through the central longitudinal axis of the container 14 is placed a nonmagnetic but electrically conductive rod forming a second electrode 18. A magnetic flux field 20 is applied (by conventional but not shown means) perpendicular to the conductive fluid 16, and parallel to orbit wall 10. Should the fluid 16 be displaced in a circular direction (spun about the central axis of electrode 18 as shown by arrow A) using some impeller device, then current will be generated in the fluid 20 and harnessed via electrodes 12 and 18. If, on the other hand, D.C. current is applied via the electrodes 12 and 18, the fluid 20 will be displaced in a circular motion (spun) about the axis of the orbit wall 18, the direction of which is dependent on the respective polarity of electrodes 12 and 18, and the orientation of flux lines 20.

As seen in FIG. 2b, the vectors of the current, flux and fluid motion bear a planar relationship between the fluid displacement and current, and a perpendicular relationship between each to the flux. It will further be observed that fluid motion is orbital about the central axis.

The use of the principles shown in FIG. 2 to produce MHD apparatus of greater efficiency and simpler in construction than known in the prior art, is shown in FIG. 3a. Here, an orbit wall formed of a cylindrical container 30, made of nonmagnetic but conductive material, such as brass, bronze, electrically conductive plastic, etc., is fixed on to a base 32 made of nonmagnetic material and preferably nonconductive material. An outlet 34 communicating from the interior of the container exits from the base 32, while an inlet 36 connected to a source of conductive fluid 38, enters into the container at the upper end. The level of the fluid is maintained at a height and head pressure achieved within the container 30 by the fluid flow and by the back EMF resistance created by the circulating fluid 36. The inlets and outlets may be connected in a loop to provide for recirculation of the fluid.

Mounted in the container 30, on a longitudinally extending shaft 40, is a plate like auger or helical body 42 having a diameter equal to that of the cylindrical container 30, thereby cooperating therewith to define a helical pathway for circulating the fluid 36 within the container. The shaft 40 is a nonmagnetic conductive electrode substantially exposed to the fluid 36 as is the inner surface of the container 30. A generally circular or torroidal magnetic field or flux pattern 44 with a North-South orientation parallel to the longitudinal axis of the container 30 is created by conventional means, such as providing a permanent magnet, externally of the container at each end. Various sources of magnetic field production are known and may be provided easily by the reader. The helical body 42 is insulated from the conductive surface of both the orbit wall container 30 and the central shaft 40.

Using the device as a D.C. electrical generator, the fluid 38 is circulated by causing it to enter the container through the top inlet 36 progressing downward through the helical path, while maintaining contact with the electrical conductive wall of the container 30 and central shaft 40 to exit the container through the outlet 34. The current generated in the fluid 38, as it passes through the flux pattern 44 is transmitted via conductors (not shown) attached to the cylinder wall 30 and the shaft 40.

The apparatus shown can be used as an AC generator by alternating the orientation of the external magnetic field (i.e. North to South, and South to North) and back to the original orientation successively. The frequency of change, or reversal of the flux pattern, will determine the frequency of the AC output following a sinusoidal waveform. An AC electromagnet can be used as the external source of the flux pattern for this effect.

Figure 3B:
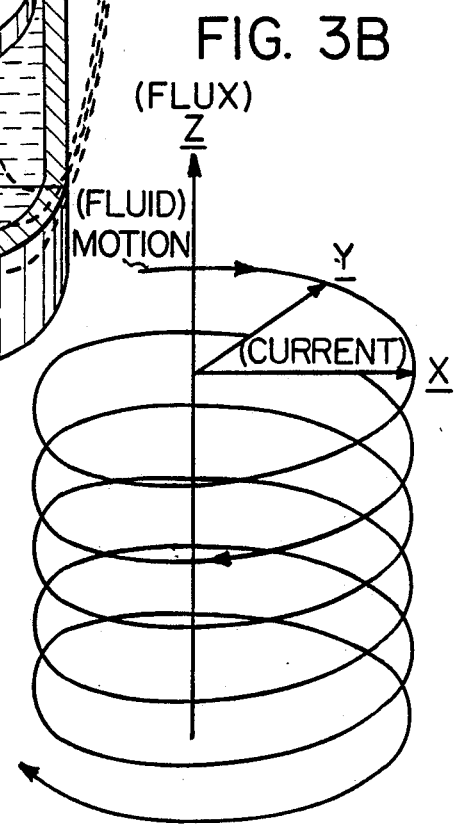

Using the device of FIG. 3 as a fluid pump, a D.C. current may be supplied to the cylindrical wall 30 and shaft 40. Upon application of the current, the electrically conductive fluid 38 is displaced and caused to rotate about the axis of the shaft 40 progressing about helical body. Depending upon the direction of rotation of the fluid 38, determined by the current polarity of the applied D.C. current and orientation of the flux pattern 44, the fluid 38 can be lifted toward the top of the container or if in the opposite direction, the head or pressure of the fluid at the bottom of the device can be increased. In either case, given sufficient quantity of fluid through the respective ports 34 and 36, the device will pump the fluid out of the container through one of the ports. Modification of the effect can also be obtained by varying the pitch of the helix.

With respect to FIG. 3b, witness again the polar relationship of current to fluid displacement, which here follows a radial and helical pathway respectively and the perpendicularity of both, to the magnetic flux. Since magnetic lines of force will follow the path of least magnetic resistance, even though the pitch of the spiral causes the plane of the fluid to be oblique, the flux will travel radially and still pierce the fluid perpendicularly to the central axis.

It has been found that the magnetic flux field can be enhanced by simultaneously producing a field within the container itself and as a result a significant increase in current production and fluid movement can be achieved. The means for such enhancement is generally depicted in FIG. 4.

Figure 4:
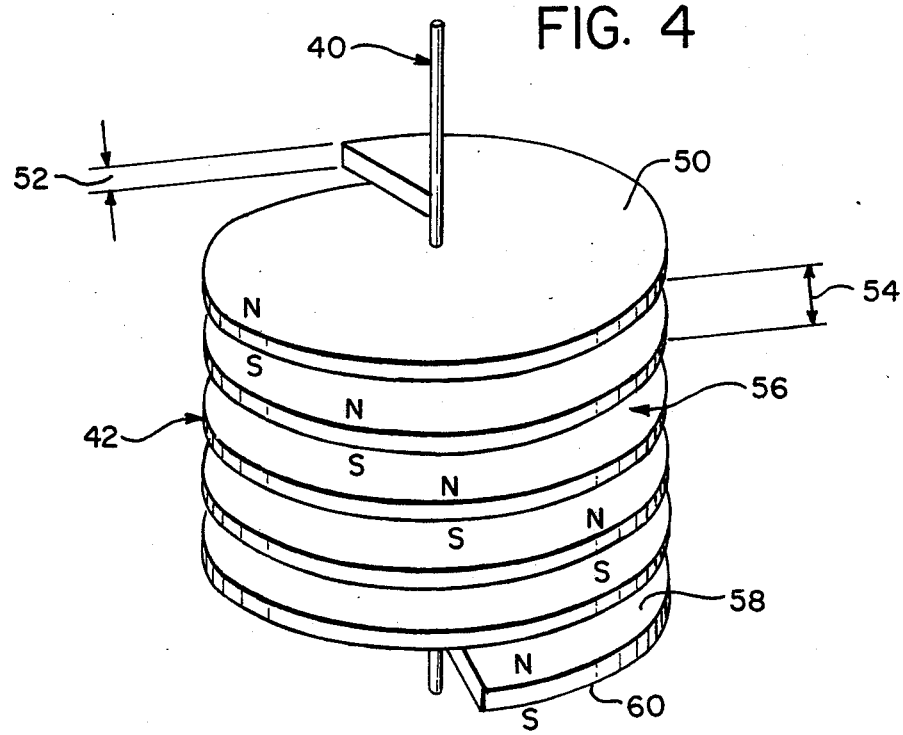
FIG. 4 is a perspective of the helical body employed in the apparatus of FIG. 3.

In FIG. 4, the helical body 42 used in FIG. 3 is shown made of a magnetically conductive but electrically nonconductive material or is fully electrically insulated and electrically insulating material. A nonmagnetic conductive electrode shaft 40 pierces the center of the helical body 42 longitudinally and is insulated therefrom. The body 42 is composed of a helix blade 50 having a plurality of turns, each of similar thickness 52 and pitch 54 providing a helical space 56 conforming thereto between the turns. Further, the blade 50 is so formed as to have an upper and lower face, 58 and 60 respectively. Each face is magnetized so if arbitrarily the upper face 58 is magnetized as the N pole and the lower face 60 is magnetized as the S pole. Thus, the pitch space 56 between successive turns forms a magnetic gap across which a flux field, generally aligned in the North-South axial direction is produced. This field augments that of the field 44.

The first and perhaps simplist way to make the body 42 is to use a permanent magnet, by either casting the helix first and then magnetizing the casting or, alternately machine turning it from machinable permanent magnetic material. Another way is to induce the body into a magnetic state under (a) conventional external magnetic force field and the use of conventional hard and soft magnetic materials, or, (b) using the techniques of superconductivity, and the Meissner effect. Other conventional ways for magnetizing the helical body may be used.

Figure 5:
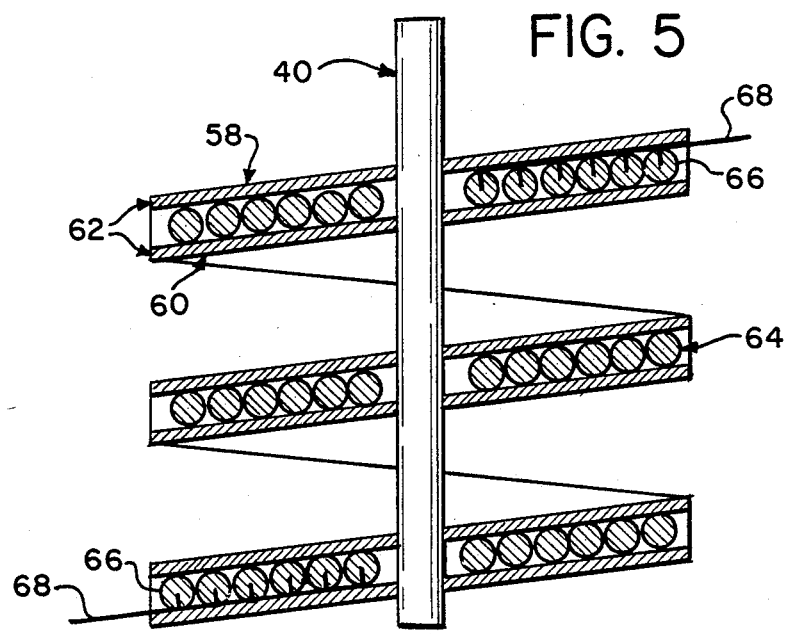
FIG. 5 is an enlarged cross section of electromagnetic helical body shown in FIG. 4.

To the same end, the helical body may be magnetized electromagnetically as seen in FIG. 5. Here the upper and lower faces 58 and 60 of the helix, are split apart, forming a continuous uniform interstice 62 between them into which is sandwiched a plurality of electrical wire conductors 64 wound concentrically and circumferencially about the conductive electrode shaft 40, and laying within the plane of the helix to form an elongated, parallel, electromagnetic coil from one end of the helix to the other. Attached "in-parallel" at the ends 66 of conductors 64, are electrical contacts 68 connected to a source of electrical current used to supply a voltage across the electromagnetic coil. If the current to the coil conductors is D.C., the output of the device will be D.C. If the input to the coil is A.C., the device will be have A.C. output.

Figure 6:
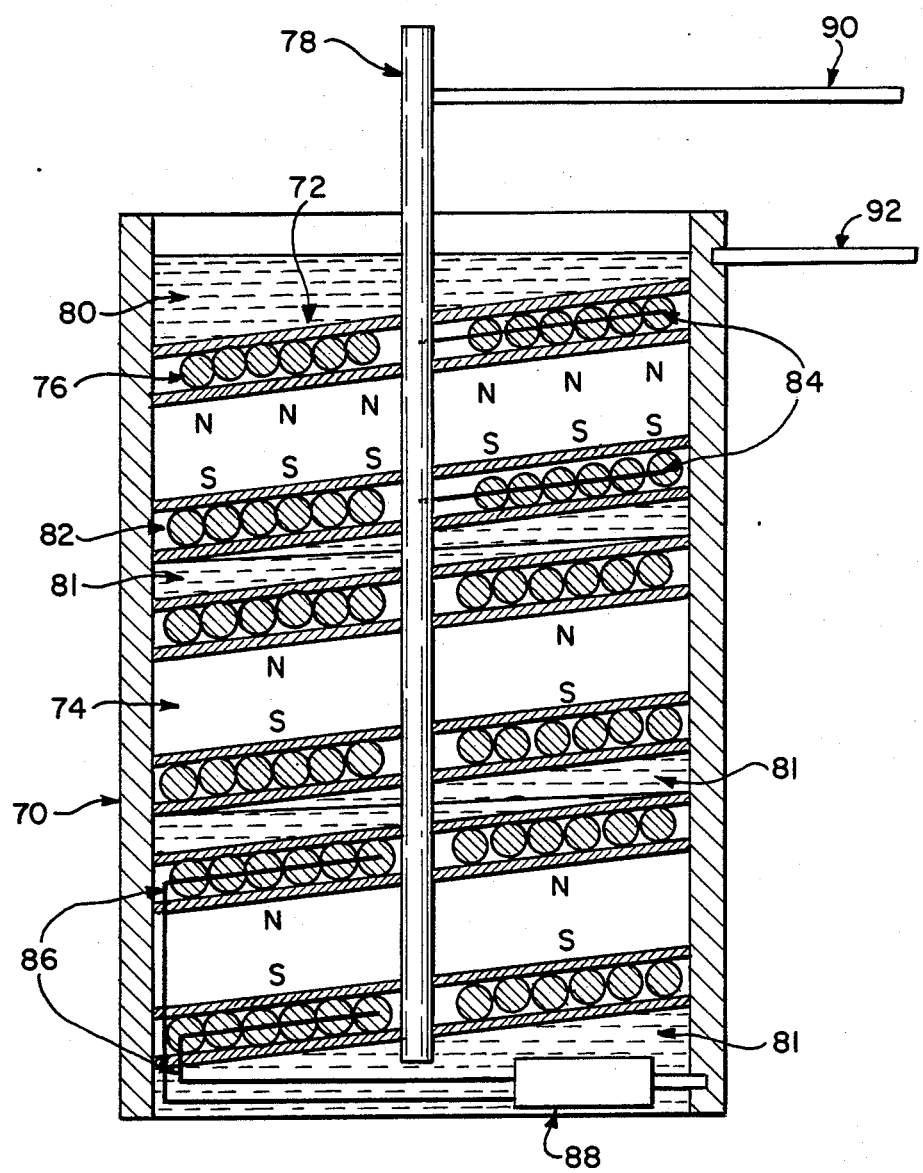
FIG. 6 is a cross section view of another embodiment of the present invention incorporating permanent magnet member in the helical body.

Another way to construct the helical body and provide for internal production of a magnetic field is represented in FIG. 6 which depicts in cross section an orbit wall forming a cylindrical container 70 in which a combination electromagnetic and permanently magnetic helical body 72 is provided. The helical body 72 consists of a permanent magnetic helix 74, such as described in connection with FIG. 4, sandwiched between an electromagnetic helix 76 such as described in connection with FIG. 5. The parallel helices 74 and 76 are insultingly fixed on a conductive electrode shaft 78, which remains substantially exposed to an electrically conductive fluid 80 filling the pitch spaces 81 between successive turns.

In this embodiment of the invention, rather than have the electromagnetic helical body 72, energized by an external source of electrical power, it is possible to provide means for internal electrical power to be supplied to the coils 82 via electrical conductors 84 and 86. Electrical conductor 84 is attached to the central electrode shaft 78, while electrical conductor 86 is attached to a voltage and amperage regulator 88 which in turn, is attached to the wall of the cylinder 70 completing the electrical circuit.

Initially, upon circulation of the electrically conductive fluid 80, a D.C. current is generated by the permanently magnetic component 74. This electrical current is initially used by the electromagnetic component 76, creating a more intense magnetic/electromagnetic flux (assuming the proper coil windings and polarity of current) in the North-South direction parallel to the axis of the container. In turn, the fluid 80, coursing through the helical pathway 81, between turns, generates a higher current (electron flow) because of the increased flux through which it passes, which in turn, again causes a greater current and then, a greater flux is developed. The accelerated progression of current to flux, to current, would continue and ultimately probably damage the device were it not for the regulator 88 which limits the voltage and current supplied to the electromagnetic coils to the design optimum of the coils. Such devices are conventional and may be easily found and recognized, in the prior art by the user. With the current and voltage limited to the coils, the excess current produced can be used as an electrical energy source (i.e. a generator). The excess current can then be utilized via tap connectors 90 and 92 for transmission to some desired electrical load.

At this point, it is necessary to point out that this increase in flux and fluid strength and thus current production, is not without some side effect inhibiting a high efficiency. That is the increase in flux strength and fluid movement produce an increase in Back-EMF, which of course, will significantly reduce efficiency as explained in connection with FIG. 7.

Figure 7:
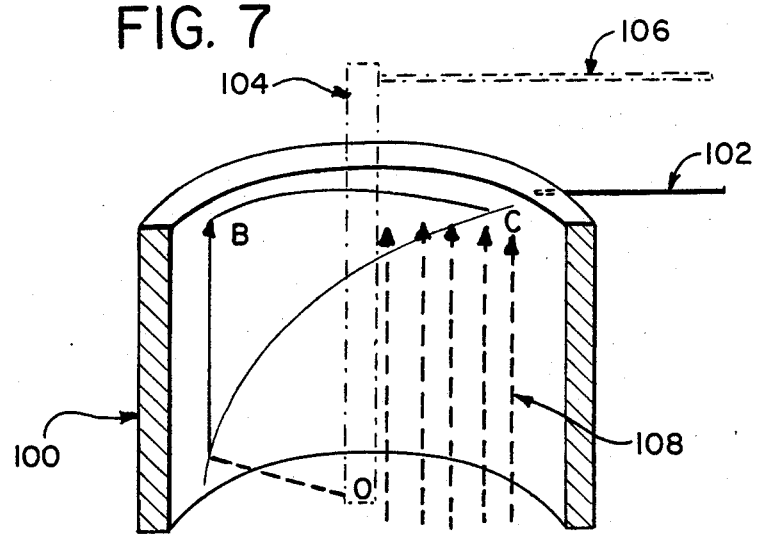
FIG. 7 is an enlarged view of a portion of a orbit wall shown in FIG. 3.

In FIG. 7 the orbit wall 100 is formed of an electrically conductive, but magnetically nonconductive material to which an electrical conductor 102 is attached, and the force (flux) field 108 are shown. For clarity, the helical body is not shown, but assumed to be present in any of the forms previously described. Upon circulation of the fluid, the electron flow (current production) is generated and is biased to run in a path represented by the line OA. However, in toto, in seeking the path of least resistance, the electron flow will travel along line AC which represents the shortest distance to the conductor 102. Any current (i.e. electron flow) is accompanied by its own magnetic field orbitally revolving about its path, which will cross the magnetic lines of force 108 substantially perpendicularly. In doing so, the induced flux about the current flow will impede the overall electron flow thus creating the "Back-EMF". This condition is inherent in all electrical currents and cannot be avoided if current is to be magnetically generated. While the impedence is created by the Back-EMF and cannot be eliminated, once the electron flow is generated along line OA, the path it takes while in the magnetic field can be controlled, to reduce the effect of the Back-EMF. Ideally, if the path of the current is parallel to the magnetic lines of force, no Back-EMF will be generated. Therefore, if the electron flow can be induced along a path A-B (radially exterior of the magnetic flux field 108) and as close to the orbit wall as possible and then along path BC to connect to conductor 102, then the Back-EMF would be substantially reduced and almost eliminated, and would only create minimal amounts in the actual electron flow path OA.

Figure 8:
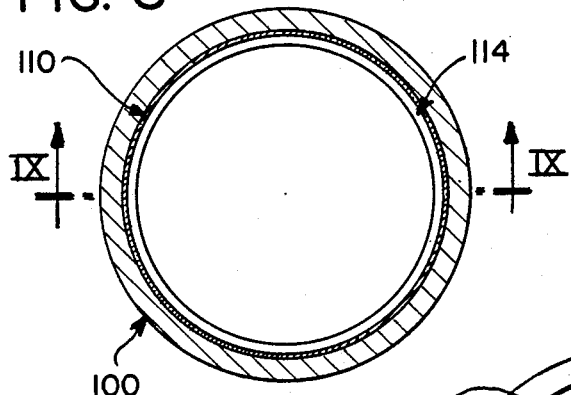
FIG. 8 is an enlarged top view of another embodiment of the orbit wall.
Figure 9:
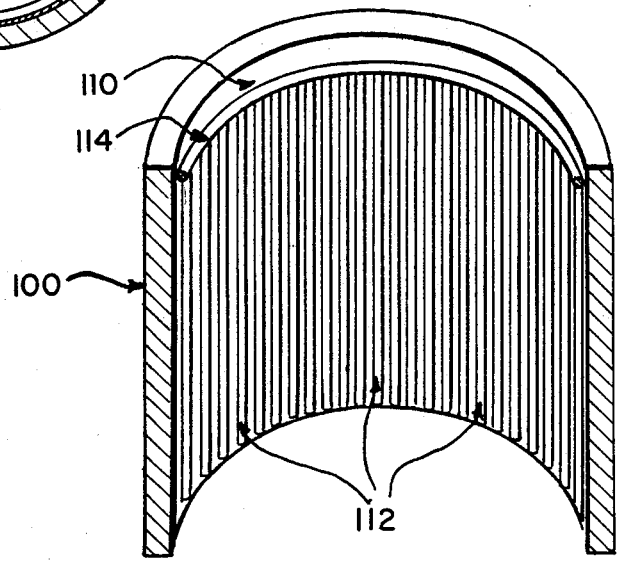
FIG. 9 is an enlarged detailed view of the wall shown along line 1X—1X of FIG. 8.

This is accomplished in the present invention as seen in FIGS. 8-9 by providing a magnetically and electrically insulated substrate 110 lining the surface of the orbit wall 100. Mounted over the substrate 110, is a plurality of nonmagnetic, electrical conductor rods 112, each insulated and separated one from the other. The conductor rods 112 are oriented parallel to each other, to the lines of force, and the central electrode 104 and are connected in common by a conductive connector ring 114 at their upper ends, which is in turn, connected by a conduit (not shown) to the conductor 102. The separation between the conductive rods 112 is not critical and will vary from device to device. Preferably however, the rods 112 should be sufficiently close to insure the receipt of virtually all of the electron flow entereing from the central electrode, and may be in the order of angstrom units. On the other hand, the rods should be separated sufficiently to allow for the flow of fluid against the conductive orbit wall and to prevent a jump of current from one to the other through the conductive fluid. This later requirement would prevent any unwanted tracking in a stepped path similar to line AC of FIG. 7. It can readily be appreciated that the orbit wall now forces an electron flow path represented in FIG. 7, by vertical lines AB while the ring connector is represented by arcuate line BC. Hence, a substantial portion of the Back-EMF associated with electo-magnetic generation of current is reduced. Elongated bars may be substituted for the rods 112.

Figure 10:
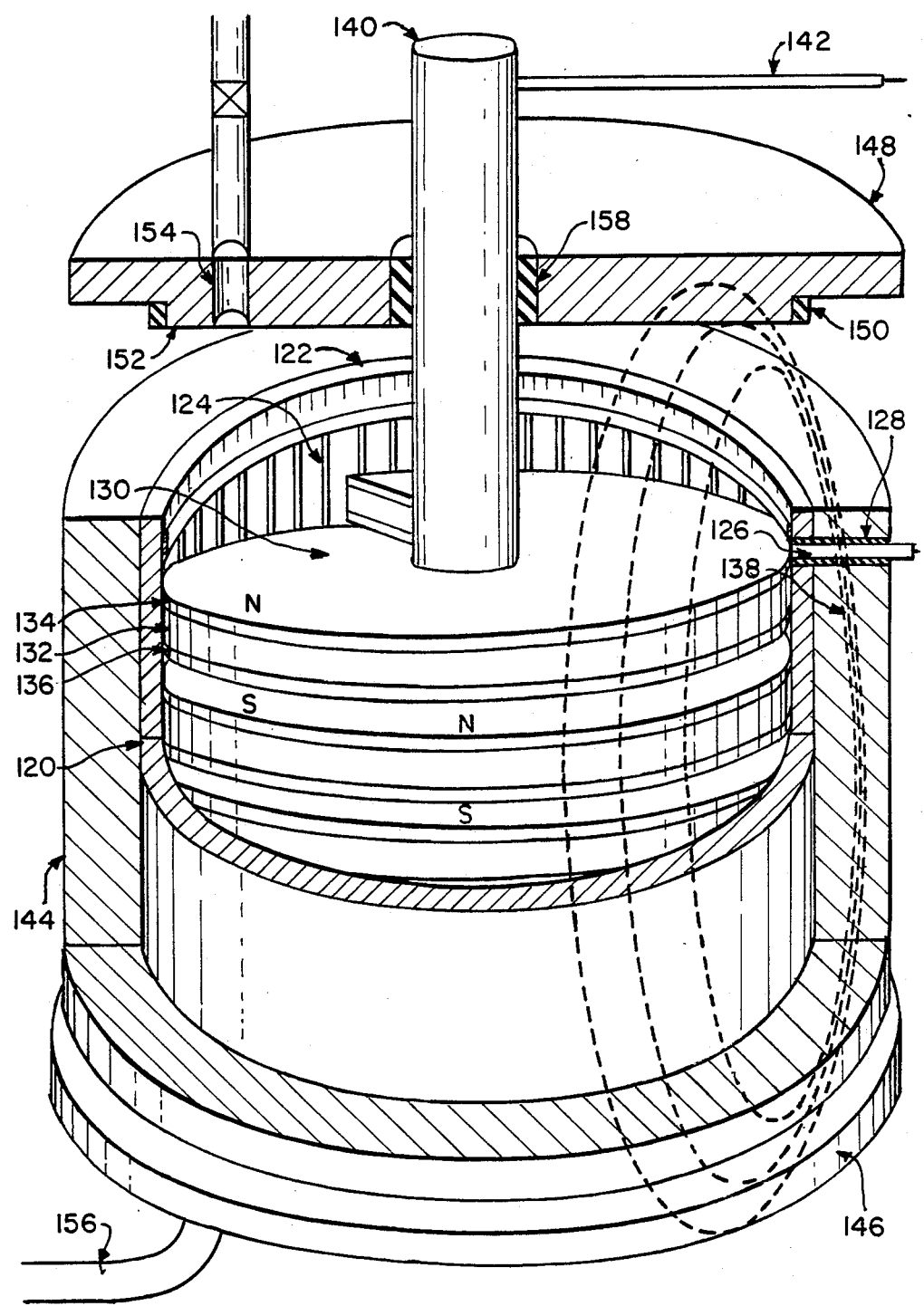
FIG. 10 is a vertical section of an electrohydromagnetic device fully assembled; first and second functions.

The principles and constructions disclosed hereinbefore, are all embodied in a unitary compact apparatus shown in FIG. 10. An orbit wall 120 has insulatingly embedded within or attached to it, a magnetically insulated, but electrically conductive collector ring 122, positioned so as to be partially or wholly radially exterior from an intended magnetic field. Lining the inner surface of the orbit wall 120 and attached to and making electrical contact with the collector ring 122 are a plurality of elongated magnetically-insulated, electrical conductors 124 such as rods or bars. The conductors 124 are electrically insulated and isolated, one from the other, but remain exposed on at least their inner surface to be in electrical contact with the fluid contained within the wall. Also attached to and making electrical contact with collector ring 122, is an electrical conductor 126 passing through the wall 120 within an electrical and fluid insulating seal 128.

Arranged concentrically within the orbit wall 120, is a helical screw body 130, whose diameter is such to insure a sealed abutment with the surface of the orbit wall 120 and conductors 124, thus defining a helical path for the circulating fluid about the axis of the orbit wall. The helical body consists of a plurality of turns composed of a permanently magnetic helix 132 sandwiched between a top electromagnetic helix 134 and a bottom electromagnetic helix 136 such as detailed in connection with FIG. 6 and which produces an enhanced magnetic flux field 138 represented by the dash lines, whose basic source of energy is the permanently magnetic helix 132.

The electromagnets 134 and 136 are energized internally as detailed in connection with FIG. 6 with the aid of a voltage regulator (not shown in this fig.). The helix body is mounted on a longitudinal electrode shaft 140 which is composed of a nonmagnetic, but electrically conductive material. Suitable insulation is provided to maintain the electrode shaft 140 magnetically and electrically insulated from the helix body although it is substantially exposed to the fluid within the container. The electrode shaft 140 is connected to an electrical conductor 142 which in combination with the conductor 126 is fed off to a suitable load.

The orbit wall 120 is fixedly housed within a surrounding jacket 144 made of magnetic or magnetizeable material. The extremities of the jacket 144 are closed by a base 146 and a removeable cover 148, both made of soft or hard magnetic material such as iron. Each is further electrically and fluidically insulated from the other components of the apparatus by means of insulated coatings and seals shown by numeral 150. The cover 148 is provided with an inner neck 152 which when positioned on the jacket in close proximity to or touches the top of the helical body and extends below the collector ring 122. The function of the end base and the cover is to provide two components for establishing and completing magnetic circuit to be described later, as well as to hold the helical body in place. A fluid inlet port 154 and outlet port 156 for the electrically conductive fluid is provided in the cover and base respectively. Also, penetrating the top end cover 148 (as illustrated) is an extension of electrode shaft 140, electrically and fluidically isolated by means of seal 158.

The fluid as employed in the embodiment of FIG. 10 as well as in the other embodiments, is composed of any liquid, gas, or plasma which is electrically conductive. Ideally, a fluid having low electrical resistance and high resistance to electrolysis is preferable since the greater the extremes of these electrical properties, the greater the efficiency of the invention. The fluid fills the container within the magnetic gaps formed in the helical body. It is circulated either externally or internally (depending on which function the device is intended), and enters and exits the container device through ports 154 and 156. In the generator mode of operation, means to build a head of pressure is provided at the input port as through use of a restricted valve 160 pump, compressor or the like to compensate for fluid resistance due to Back-EMF inherent in magnetic generation of electrical current and fluid viscosity (friction).

The exterior jacket 144 functions to complete the magnetic circuit and is of a material which supports, enhances, or is itself, a magnet, be it permanent or electromagnetic. As illustrated by lines of flux 138, the exterior jacket 144, in conjunction with base and cover, constitute a magnetic circuit necessary to reduce flux leakage of the device. If the jacket is a magnet itself, the North-South orientation of the jacket must be parallel and opposite to that of the helix. If the jacket is an electromagnet, its source of energy can be internal by means of electrical contact with the central electrode shaft 140 and the employment of another voltage and amperage regulator between the coil and one of the electrical contacts, similar to the internal energizing of the electromagnetic helical body. The apparatus represented in FIG. 10 can be used for three functions:

As a D.C. generator, electrically conductive fluid is circulated through the device by means of an external source creating mechanical motion in the fluid. As the fluid flows through the magnetic gaps in the helical body and is penetrated by the magnetic field, an electron flow is generated as described in connection with FIGS. 7-9.

As an A.C. generator, if an electromagnetic helix is excited with an A.C. input, upon circulation of an electrically conductive fluid through the device, an A.C. current is produced.

As a fluid pump, if D.C. current is supplied to conductors 128 and 138, the electrically conductive fluid contained in the device will be displaced orbitally about central electrode shaft 140, and progress through the magnetic gaps, the rotation of which is dependent on the polarity of the current and the orientation of the magnetic field and the pitch or distance between adjacent blades or dividers.

Returning at this point to the illustrated form of the invention shown in FIGS. 2 and 2a, it was shown at that point that increased efficiency and electric current productivity were developed over the prior art in a device in which the container had a bottom wall disposed generally horizontally, i.e. at a 0 degree pitch to the container axis. Thus, it is clear that the pitch angle of the helix blades is not critical and may be selected at any angle between 0 and 90 degrees with respect to the axis of the container. With this in mind, it has been found that an orbital path can even be developed through a tubular container without the use of a true helical body, while at the same time providing unidirectional continuity of fluid flow under the influence of a perpendicularly directed magnetic flux field.

Figure 11:
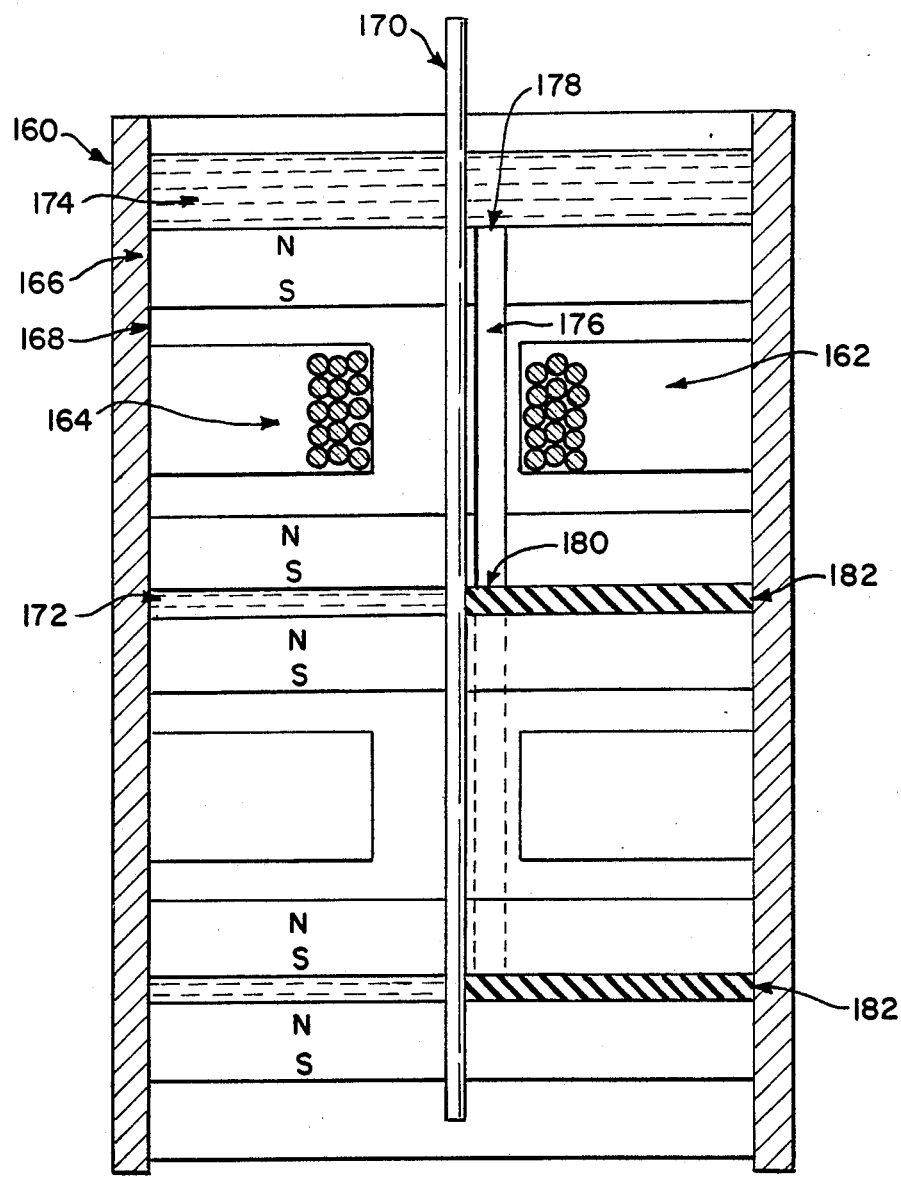
FIG. 11 is a vertical section through another embodiment providing helical and orbital flow with 0 degree pitch dividers.
Figure 12:
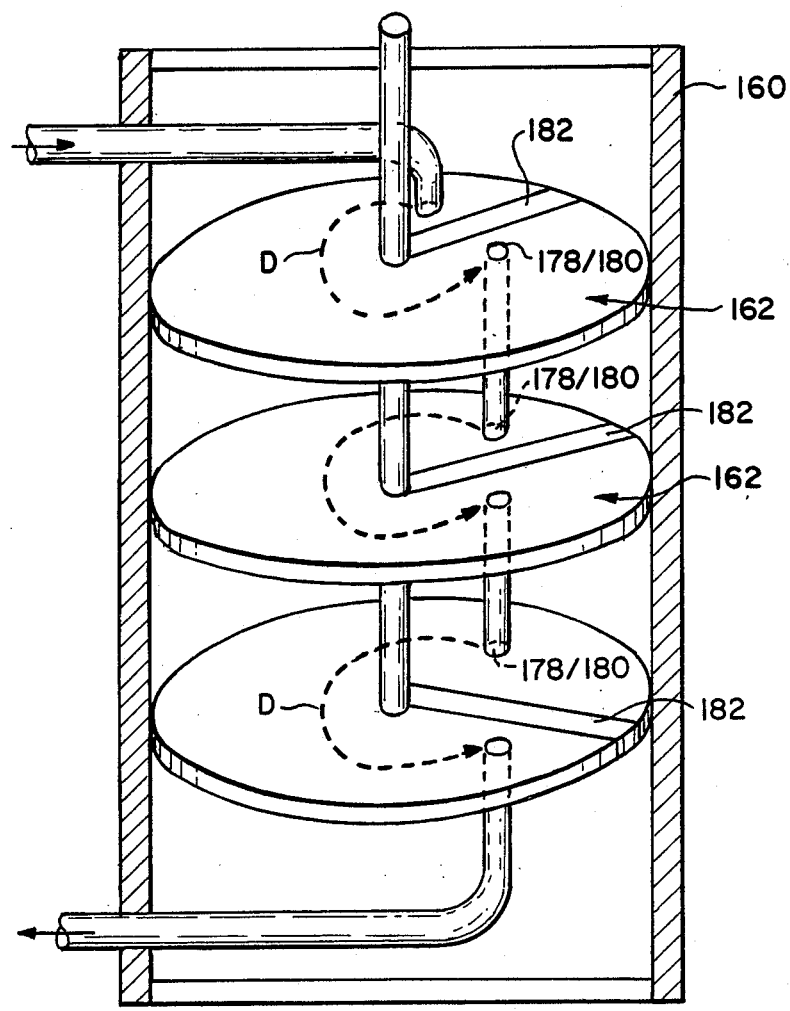
FIG. 12 is an enlarged detail of the device shown in FIG. 11.

As seen in FIGS. 11 and 12, an embodiment is shown in which the extreme 0 degree pitch is illustrated. Here, an orbit wall container 160 constituting the first electrode is provided with one or more discrete planar dividers, generally depicted by the numeral 162. Each of the dividers 162 is formed, for illustration, by a central electromagnet 164 sandwiched between a pair of permanent magnet plates 166, the topmost surface forming a receptacle for the fluid. Here the electromagnet 164 is provided with a soft iron core 168 which is in cross section H-shaped. It will be recognized here that the dividers can be formed in the manner shown for any of the blade construction of the helical body, as in FIGS. 4, 5, or 6. Similarly, the tubular orbit wall can be formed in any of the precedingly described ways. Each divider 162 is mounted so as to abut the inside surface of the orbit wall 160, and suitable insulation is provided between the orbit wall 160 and the individual dividers 162. The second electrode 170 passes through the center of the dividers 162 and is also suitably insulated therefrom. The dividers 162 are located generally parallel to each other and are spaced uniformly along the axis of the cylinder. The space 172 between each of the dividers 162 is filled with electrically conductive fluid 174 and defines as well the magnetic gap between adjacent dividers.

Extending through each of the dividers 172 is a through bore conduit 176 defining an egress/inlet 178 at one end and an outlet/ingress 180 at its opposite end. Thus, each conduit 176 provides the egress for one divider and the ingress for the next divider. A radial barrier dam 182 is disposed within the space 172 between adjacent dividers 162. The barrier dams 182 are preferably elastomeric elongated rectangular cross sectional elements which form a seal with the adjacent dividers 162 and the tubular orbit wall and the central core or second electrode 170. Thus, the barrier dams 182 block full circular movement of the fluid across the surface of each divider 162. By arranging the dividers 162 into a stack as seen in FIG. 12 with each succeeding divider rotatively offset from its preceding divider so that the fluid is inlet from each divider on to the same relative side of the barrier dam in the next divider and to outlet from the opposite side of the barrier dam to the next divider, fluid will be caused to flow orbitally within the container, here shown as being counterclockwise by the arrow D.

Continuous fluid flow is obtained by providing the narrow barrier dam 182 extending from the center electrode 170 to the orbital wall 160 at each level of the magnetic space 172 with an ingress port to the gap on one of the barrier dam and an egress port from the space on the other side of the barrier dam. In effect, the egress port from one magnetic gap level will be the ingress port to the next magnetic gap level, and the dams, when viewed alone, will trace a helical spine about the central electrode, even through each divider and dam is separate.

Thus, in process when the device is loaded, fluid 174 will follow an orbital path from one end of the container around the central electrode 170, while maintaining contact with the tubular orbit wall, to the other end of the container where it will exit. In this embodiment of the invention, rather than the fluid path following a smooth helical track created by a single helical body, the fluid will "step" to/from each level through the respective conduits. It is obvious that the characteristic of the fluid flow in this configuration is still orbital with the fluid motion and current produced, co-planar with each other and perpendicular to the magnetic flux.

Further, an additional advantage to this configuration is that with the employment of electromagnetic cores the magnetic coil windings can be wound in "series" about the central electrode with the winding conductor running from one divider to the other, buried within the barrier dam.

In FIGS. 11 and 12 the container is shown as being vertical and fluid flow insured by providing a head at the upper end. The container may, however, be laid at an angle or horizontally and sufficient fluid continuity provided by use of a fluid pump to provide a sufficient pressure head. Further, since the container is closed at least at its bottom or outlet end, a single divider can be used to provide two compartments and orbital flow. This construction can be employed with greater efficiency by tilting each of the planar dividers 162 so as to increase the speed of fluid flow. Clearly, since operation is apparent at 0 degrees, it will be apparent at about 90 degrees as well, the only limitation being in maintaining a continuity in the flow of fluid having contact simultaneous with the orbit wall and the central electrode. In practice, however, less severe tilts than 90 degrees will be preferred.

The embodiment shown in FIGS. 11 and 12 can be easily employed in a device shown in detail in FIG. 10, in lieu of the helical body described therein. Thus, all embodiments are interchangeable and compatible with each other and employ the same principles of operation.

Throughout this description, references have been made to an external means of circulation for the fluid. Such source may be a line supply of fluid, a compressor, a pump, or a continuous loop within the inlet and outlet. The central shaft may be journalled at each end of the jacket, in suitable bearings, so that the helical body conjointly held by the shaft is rotatable about the central axis. With the rotation of the helical body, the device forms a conventional auger or archimedes pump. The device in this configuration will generate an electrical current while simultaneously displacing the fluid.

The apparatus shown in FIG. 10, is easily modified as will be obvious. A rotary electrical contact (brushes and wiper) can be provided for contact with the electrode shaft. Magnetic jacket 144 may be formed with an electromagnetic coil, either internally or externally energized to enhance the magnetic field, while serving as a magnetic containment circuit in conjunction with the base and cover. The total device as described is set upon a magnetically and electrically inert base and may be further housed in an insulated outer housing. In operation as a pump, as the electroshaft is rotated, the helical body also turns, and displaces the fluid. While doing so, the magnetic gaps are rotated through the fluid and generate an electrical current, which is then utilized through the conductors.

The foregoing description of the principles to this invention, and certain modes of its application is to be construed as illustrative only, other changes in shape, size, arrangements of parts, and function, may be employed without departure from the true scope of the invention as further defined in the appended claims.

What is claimed is:

1. Magnetohydrodynamic apparatus comprising a container having a tubular conductive wall functioning as a first electrode, fluid port means spaced at the ends of said container for the ingress and egress of an electrically conductive fluid to and from said container, at least one divider disposed insulatingly from said wall in said container separating said container into at least two axially spaced compartments, a conductive rod forming a second electrode disposed insulatingly through said at least one divider along the center of said container, each of said compartments defining in cooperation with said wall and said rod an orbital pathway for the flow of said electrically conductive fluid, means for transferring fluid from one orbital pathway to the next adjacent orbital pathway, means for inducing a magnetic field across said orbitally moving fluid with a direction parallel to the axis of said container, and conductor means attached to each of said electrodes for the transfer of an electric current, to or from said device, produced by the interaction of said fluid and magnetic field.

2. Magnetohydrodynamic apparatus comprising a container having a tubular conductive wall functioning as a first electrode, a conductor rod disposed in said container and extending along a longitudinal axis functioning as a second electrode, fluid port means spaced at the ends of said container for the ingress and egress of an electrically conductive fluid to and from said container, at least two dividers disposed in said container about said second electrode separating said container into a plurality of axially spaced compartments allowing fluid to be held on the surface of said dividers, each of said dividers having a barrier disposed radially between the conductor rod and the wall to prevent the flow of fluid on the surface from being completely circular, and means located adjacent one side of said barrier for permitting flow of fluid from one divider to another, said at least two dividers being rotatively offset one from the other so that the fluid flowing from each divider passes onto the same relative side of the barriers and exits to the next divider from the opposite side of the barriers, thereby defining in cooperation with said wall an orbital pathway for the flow of said electrically conductive fluid, means for inducing a magnetic field crossing said orbital path with a direction parallel to the axis of said container, and conductor means attached to each of said electrodes for the transfer of an electric current, to or from said device, produced by the interaction of said fluid and magnetic field.

3. The apparatus according to claim 2 wherein said means for permitting flow of fluid from one divider to another comprises a conduit extending through said divider.

4. The apparatus according to claim 3 wherein said at least two dividers are fixedly disposed parallel to each other and at an angle to the axis of said container.

5. The apparatus according to claim 4 the angle at which said dividers are disposed is between 0 and 90 degrees with respect to the axis of the container.

6. The apparatus according to claim 2 wherein said dividers comprise magnet means oriented with the North-South direction of their flux field parallel to the axis of said container.

7. Magnetohydrodynamic apparatus comprising a container having a tubular electrically conductive wall, said wall functioning as a first electrode, fluid port means spaced at the ends of said container for the ingress and egress of an electrically conductive fluid to and from said container a helical body insulatingly disposed in said container and defining in cooperation with said wall a helical pathway for the flow of said electrically conductive fluid introduced to said container, a second electrically conductive electrode comprising an elongated conductive rod disposed along the central axis of said container and insulatingly through the center of said helical body, means for inducing a magnetic field through said fluid having a North-South direction parallel to the axis of said container, and conductor means attached to each of said electrodes for transfer of an electric current, to or from said device, produced by the interaction of said fluid and magnetic field.

8. The apparatus according to claim 7, wherein said helical body comprises magnetic means and is electrically insulated from said first and second electrodes, said first and second electrodes being nonmagnetic.

9. The apparatus according to claim 7, wherein the surface of the tubular wall is formed of a plurality of conductors, made of electrically conductive, nonmagnetic conductive material and oriented parallel to the central axis, said conductors being joined by a common electrically conductive ring connected to said first conductive electrode.

10. The apparatus according to claim 7, wherein the helical body comprises a continuous flat blade of plural turns, said blade being formed of permanently magnetic material, one face of said blade being of one magnetic pole and the other face being of the opposite magnetic pole, thus forming a magnetic gap between the turns of said blade.

11. The apparatus according to claim 7, wherein the helical body comprises a continuous flat blade of plural turns, said blade being formed of permanently magnetic sheet material sandwiched between an upper and lower electromagnetic coil, each connected to a source of current.

12. The apparatus according to claim 7, wherein the helical body comprises a continuous flat blade of plural turns, the flat blade comprising a sandwich formed of an upper layer and a lower layer of magnetic material having interposed therebetween, a plurality of electrical wire conductors wound concentrically about the second electrode, and being connected at their ends to a source of current to form an electromagnetic coil.

13. The apparatus according to claim 7, including an exterior jacket of magnetic material surrounding said wall.

14. The apparatus according to claim 7, including means for applying the magnetic field and movement to said fluid simultaneous wherein an electric current is generated in said electrodes.

15. The apparatus according to claim 7, including means for applying a current to said electrodes simultaneous with a magnetic field to pump said fluid.

16. The apparatus according to claim 7, wherein the electrically conductive fluid is selected from the group consisting of liquid, gas and plasma having low electrical resistance and high resistance to electrolysis.

17. The apparatus according to claim 7, wherein said helical body comprises a continuous blade of plural turns, the exterior configuration of which is substantially equal to the inner configuration of said closed wall so that the edges of said blade abut the surface of said closed wall, and including means for insulating said blade from said wall.

18. In a method for magnetohydrodynamic production of current or fluid flow wherein a current is caused to flow between two spaced parallel electrodes forming a tubular container holding a conductive fluid under influence of a magnetic flux field parallel to said electrodes, the improvement comprising the steps of displacing said fluid on a substantially transversely disposed divider in an orbital path between said electrodes, coplanar with the current flow and perpendicular to the magnetic flux field.

19. The method according to claim 18, wherein said divider is disposed so that said fluid is caused to flow in a helical orbital path about one of said electrodes, and said other electrode is a closed wall container to confine said fluid to said orbital path, and said flux field is induced parallel to the axis of the container.

20. The method according to claim 19, wherein said divider is magnetic and generates a magnetic flux field within said container.

* * * * *